United States Patent [19]

Kipling

[11] 3,953,861

[45] Apr. 27, 1976

[54] RECORDING STYLUS

[75] Inventor: Barry John Kipling, Hitchin, England

[73] Assignee: Rank Xerox, Ltd., London, England

[22] Filed: Apr. 30, 1975

[21] Appl. No.: 572,978

[30] Foreign Application Priority Data

May 29, 1974 United Kingdom ............... 23746/74

[52] U.S. Cl. ............................................ 346/139 C

[51] Int. Cl.[2] ................... G01D 15/00; G01D 11/10

[58] Field of Search ........... 346/139 C, 74 EH, 74 E

[56] References Cited

UNITED STATES PATENTS

| | | | |
|---|---|---|---|
| 3,736,594 | 5/1973 | Simpkins et al. | 346/139 C |
| 3,754,283 | 8/1973 | Alden | 346/139 C |
| 3,761,954 | 9/1973 | Hansen et al. | 346/139 C |

*Primary Examiner*—Joseph W. Hartary

[57] ABSTRACT

A recording stylus comprising a metal blade having a stem portion and a stylus point at one end, a second metal blade adjacent said stem portion and a resilient material between the two metal portions forming an adhesive bond between them.

5 Claims, 3 Drawing Figures

RECORDING STYLUS

BACKGROUND OF THE INVENTION

This invention relates to a recording stylus. Such styli are moved relative to a recording sheet to mark the sheet by applying ink, an electrical discharge or pressure. In the case of marking with ink the sheet may be of ordinary paper, but in the other cases the sheet must be of a type sensitive to the electrical discharge or pressure so as to form a mark immediately or by subsequent development.

When there is a discontinuity in the recording sheet, as for example at the gripping bar on a recording drum, the stylus is moved out of its normal position by the discontinuity. In the past, difficulty has been encountered in finding a recording stylus which will return to its normal recording position in the shortest possible time after engaging the discontinuity.

It is therefore an object of this invention to provide a recording stylus.

It is a further object of this invention to provide a recording stylus which quickly rebounds after encountering a discontinuity.

SUMMARY OF THE INVENTION

According to the present invention, there is provided a recording stylus comprising a metal blade having a stem portion and a stylus point at one end, a second metal blade adjacent said stem portion, and a resilient material between the two metal portions forming an adhesive bond between them. In an alternate embodiment, a shrink sleeve is shrunk around the two metal portions and the resilient material between them. Preferably, the stem portion is bent through an angle in the range of 30° to 60° at the end adjacent the stylus point, the second metal portion and the resilient material extending parallel to the stem portion past the bend.

DESCRIPTION OF THE DRAWING

Examples of the prior art and of the present invention will now be described with reference to the accompanying drawing in which.

DESCRIPTION OF THE EXEMPLARY EMBODIMENT

Figure 1:
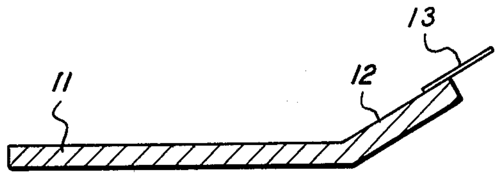
FIG. 1 is a longitudinal section through a prior art stylus.

The prior art stylus of FIG. 1 is of 0.008 inch thick phosphor bronze 0.125 inches wide, with a total length of about 2 inches. The stylus has a stem portion 11 and is bent through an angle in the range of about 30° to about 60° at an end portion 12 to the free end of which is affixed the stylus point 13.

The stylus shown in FIG. 1 finds utility in a machine such as the 400 Telecopier facsimile transceiver, manufactured by Xerox Corporation. In that machine, recording paper is wrapped around a rotating drum, the leading edge of the paper being clamped to the drum by a gripper bar mechanism, such as that disclosed in U.S. Pat. No. 3,618,123. Although the stylus of FIG. 1 has proved satisfactory for recording in slow speed machines, it has been found to have excessive and undesirable bounce after hitting the gripper bar during high speed operation.

Figure 2:
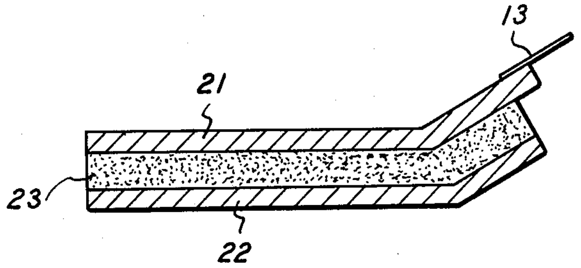
FIG. 2 is a longitudinal section through a stylus modified according to the present invention.

In order to reduce the undesirable bounce, the stylus of FIG. 2 has been developed. This improved stylus is of a sandwich construction, with the top side 21 of the sandwich being formed by a stylus as in FIG. 1, and the bottom side 22 of the sandwich being formed by a shortened stylus. The stylus on the lower side 22 ends in the mid-region of the end portion of the stylus, so that the sandwich construction extends over all the stem portion 11 and part of the end portion 12 of the stylus of FIG. 1. The center portion of the sandwich construction is formed by a resilient adhesive material 23. This material and its thickness are selected so that oscillation of the stylus at right angles to its plane is sufficiently damped without the stylus becoming too stiff to accommodate variations in the path of travel of the stylus point. Suitable adhesive materials include, for example, a 1/64 inch thick double-sided adhesive foam (No. 9394 made by Minnesota Mining and Manufacturing Company). A variation was also made in the material of the upper and lower sides 21 and 22 of the sandwich construction, these being made from a beryllium copper alloy 0.01 inches thick and 0.09 inches wide.

Figure 3:
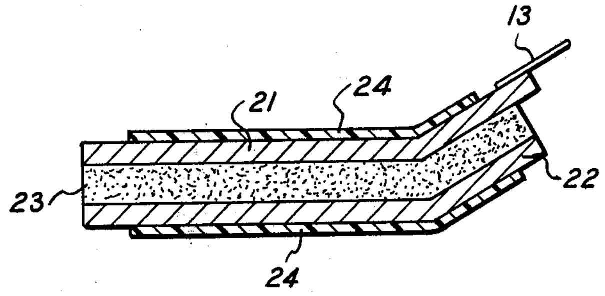
FIG. 3 is a longitudinal section through an alternative modification according to the present invention.

In the modified construction of FIG. 3, a shrink sleeve 24 was applied to the modified stylus of FIG. 2. A Hellerman VFP 24 shrink sleeve was used. An internal diameter of 3/32 inches was found that most suitable for the shrink sleeve. The addition of shrink sleeving to the sandwich construction of FIG. 2 was found to reduce excessive oscillation of the stylus assembly, whereas a shrink sleeve applied to the sandwich construction of FIG. 2 without the resilient material in the center was found to increase the excessive oscillation. Although the shortened stylus is shown mounted on the outside of the bend angle of the stylus assembly, it was found equally effective on the inside of the angle.

Accordingly, there have been shown illustrative improved recording styli. It is understood that the above-described arrangements are merely illustrative of the application of the principles of this invention. Numerous other arrangements may be devised by those skilled in the art without departing from the spirit and scope of this invention.

What is claimed is:

1. A recording stylus comprising the combination of
- a first metal blade having a stem portion and an angulated end portion,
- a stylus point secured to and extending beyond the end portion of said first blade,
- a second metal blade having a stem portion and an angulated end portion aligned with the stem portion and the end portion, respectively, of said first blade,
- a resilient member disposed between and adhesively bonded to said first and second blades, said resilient member at least partially extending along both the stem portion and the end portion of each of said blades to conteract any tendency of said stylus to oscillate.

2. The stylus of claim 1 wherein the angulation of the end portion relative to the stem portion of each of said first and second blades is in the range of 30° to 60°, and said resilient member is thicker than either of said first and second blades.

3. The stylus of claim 2 wherein the stem portions and the end portions of said first and second blades have the same angular relationship.

4. The stylus of claim 3 further comprising a shrink sleeve shrunk around said first and second metal blades and the resilient material between them.

5. The stylus of claim 1 further comprising a shrink sleeve shrunk around said first and second metal blades and the resilient material between them.

* * * * *